(No Model.)  5 Sheets—Sheet 1.
R. P. HENRY.
HOISTING APPARATUS.
No. 443,993.  Patented Jan. 6, 1891.
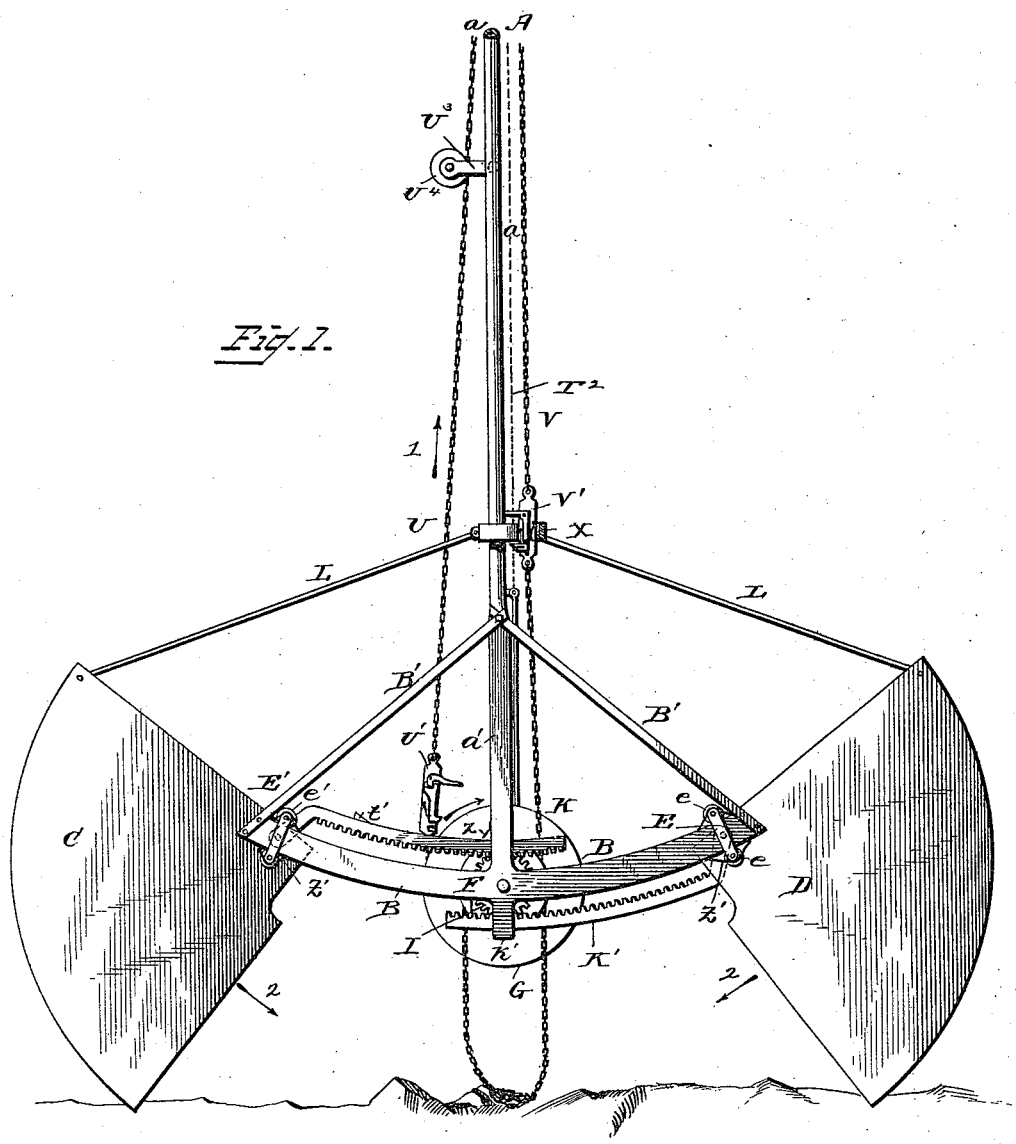
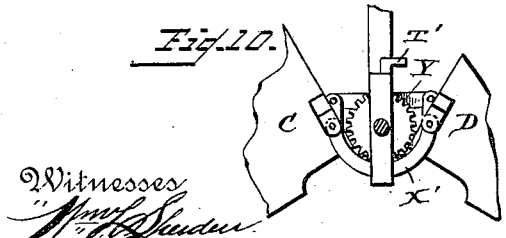
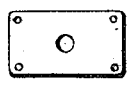
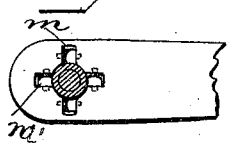
Witnesses
Inventor
Robert P. Henry,
By his Attorneys,
Baldwin, Davidson & Wight
THE NORRIS PETERS CO., PHOTO-LITHO., WASHINGTON, D. C.

(No Model.) 5 Sheets—Sheet 2.
R. P. HENRY.
HOISTING APPARATUS.
No. 443,993. Patented Jan. 6, 1891.
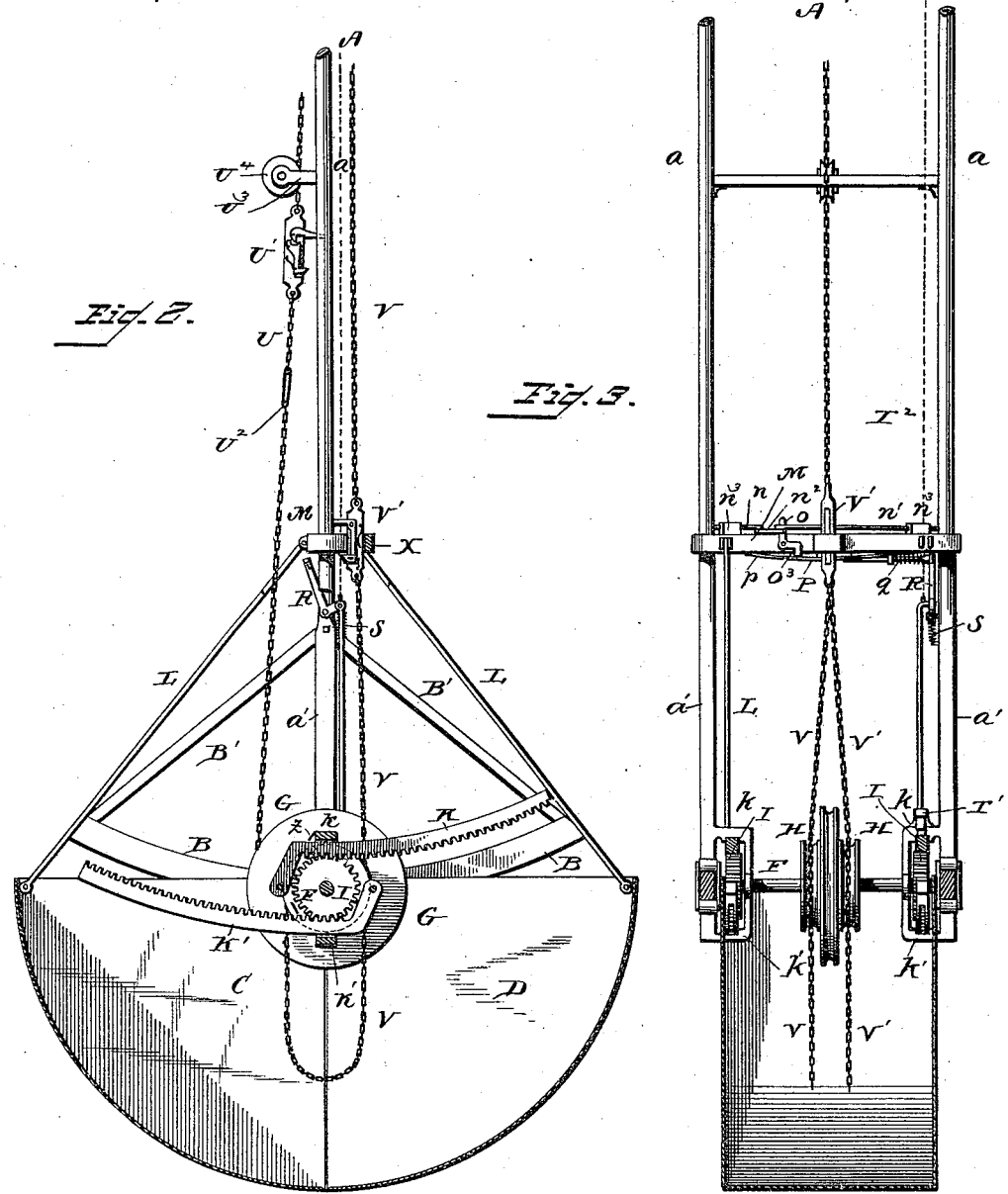
Witnesses
Inventor
Robert P. Henry.
By his Attorneys
Baldwin, Davidson & Wight

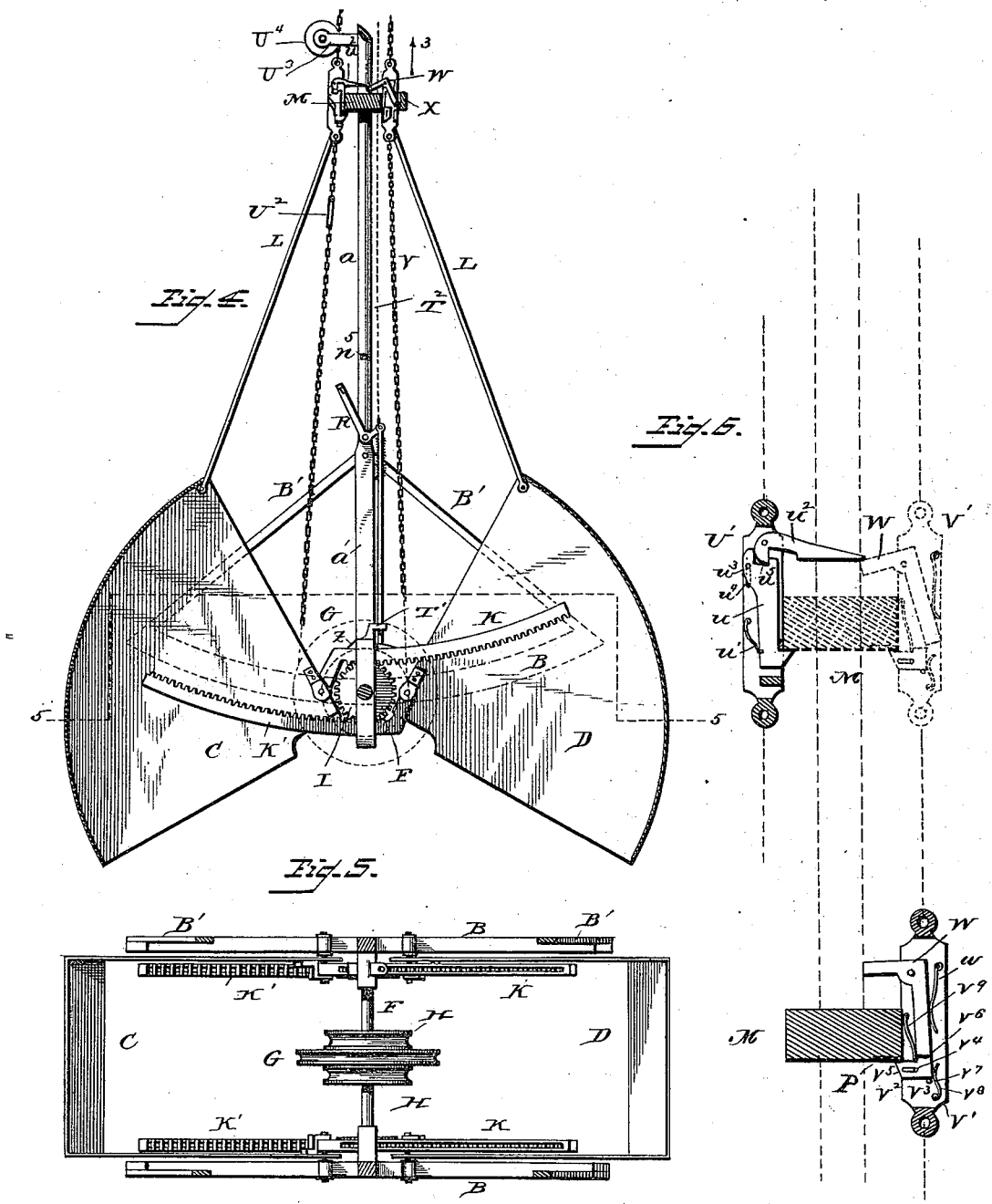

(No Model.) 5 Sheets—Sheet 4.
R. P. HENRY.
HOISTING APPARATUS.
No. 443,993. Patented Jan. 6, 1891.
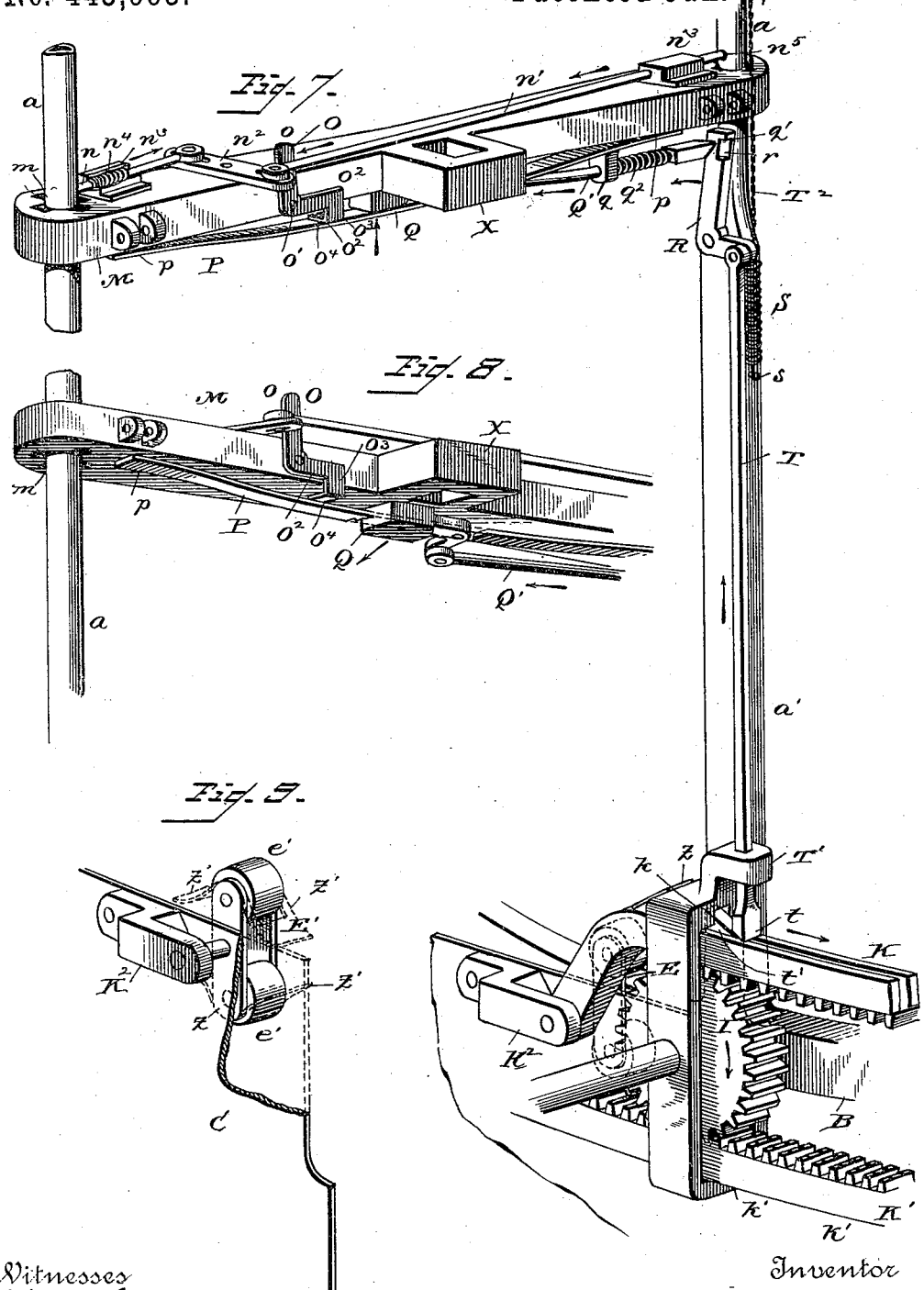
Witnesses
Inventor
Robert P. Henry.
By his Attorneys
Baldwin, Davidson & Wight.

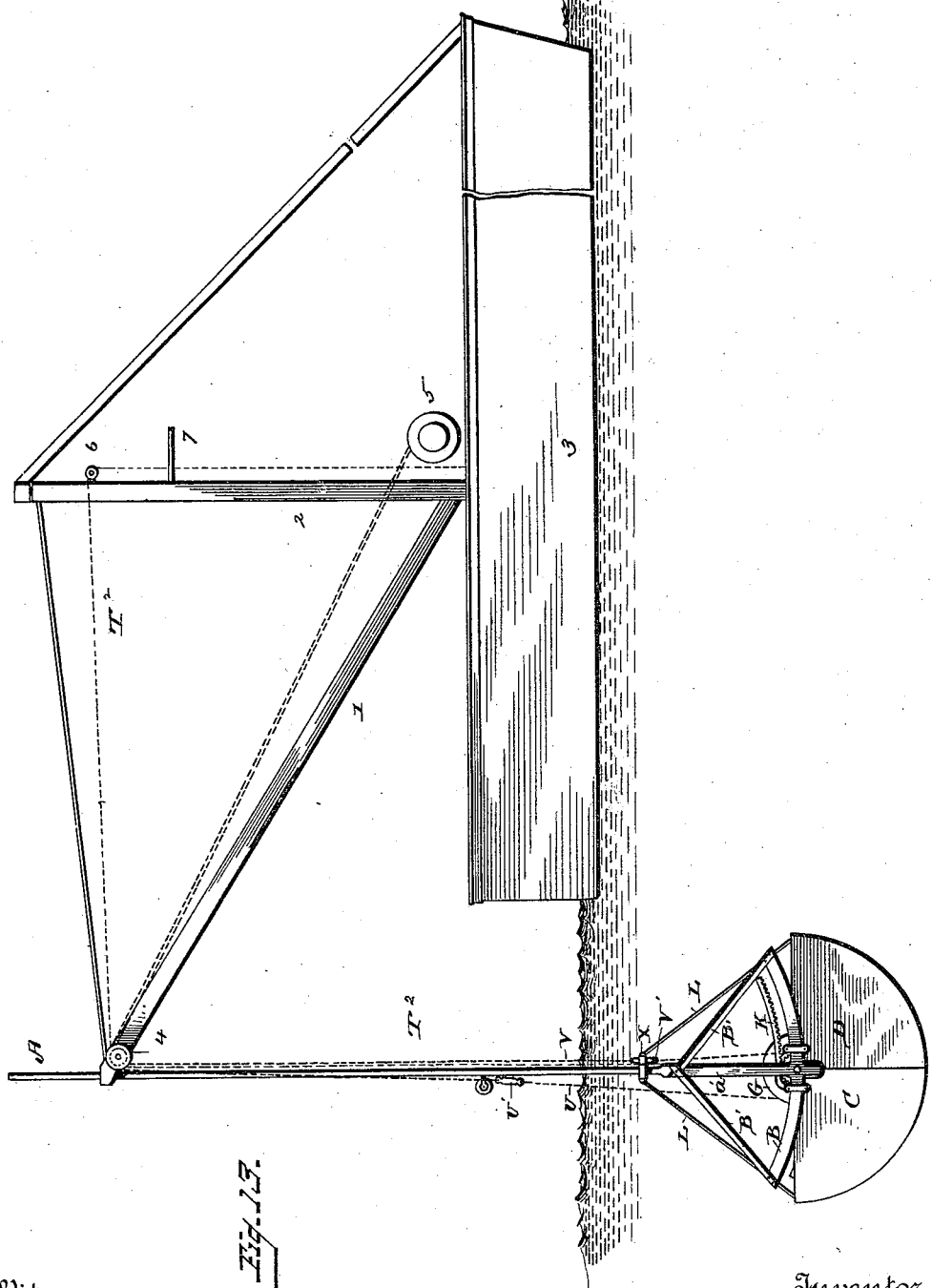

UNITED STATES PATENT OFFICE.

ROBERT PINCKNEY HENRY, OF WADDELLS, NORTH CAROLINA.

HOISTING APPARATUS.

SPECIFICATION forming part of Letters Patent No. 443,993, dated January 6, 1891.

Application filed December 6, 1889. Serial No. 332,777. (No model.)

*To all whom it may concern:*

Be it known that I, ROBERT PINCKNEY HENRY, a citizen of the United States, residing at Waddells, in the county of Rockingham and State of North Carolina, temporarily residing at Leon, in the county of Anne Arundel and State of Maryland, have invented certain new and useful Improvements in Hoisting Apparatus, of which the following is a specification.

My invention relates especially to dredging apparatus, and particularly to that class of dredging apparatus known as "clam-shell dredgers," in which shells or buckets are pivoted to a frame and are adapted to close and open to take in and empty the material operated upon. This class of dredging apparatus possesses material advantages over other kinds for certain classes of work; but heretofore clam-shell dredgers have not been efficient when working on hard material. They have not been able to cut sufficiently deep into the material to fill the buckets, the principal reason being that their cutting-edges have not been presented at the proper angle to enter the material operated upon with the least resistance and to so enter and pass through the material as to approximately fill the buckets.

By my invention I am enabled to work efficiently upon all kinds of material, and particularly upon hard material. The cutting-edges of the buckets are presented to their work so as to enter and scoop up the dredged material in the most efficient manner.

The primary feature of my invention which enables me to effect these results is mechanism for shifting the pivotal points of the buckets and for cutting a continuous curve. I also provide mechanism for opening and closing automatically the buckets at the proper time.

The details of construction and the subject-matter claimed are hereinafter designated.

The accompanying drawings show my improvements embodied in an apparatus simple and efficient and in the best way known to me at the present time.

Figure 1 is a front elevation of a clam-shell dredger embodying my improvements and showing the shells spread apart and ready to cut. Fig. 2 is a similar view with the dredgers closed. Fig. 3 is a vertical central section of the same. Fig. 4 is a view similar to Figs. 1 and 2 with the buckets in their dumping position. Fig. 5 is a transverse section on the line 5 5 of Fig. 4. Fig. 6 is a diagram view showing the relative positions and construction of the latches and tripping mechanism. Fig. 7 is a perspective view showing partly the bucket-spreading devices and the locking mechanism for securing the cross-head to the uprights. Fig. 8 is a detail view in perspective of said locking mechanism. Fig. 9 is a detail view in perspective of a guide-block attached to one of the bucket-shells. Fig. 10 is a detail view showing the manner of connecting the pivotal points of the buckets rigidly when the bucket-spreading mechanism is removed. Fig. 11 is a detail view of the plate used for connecting the blocks to which the buckets are pivoted when the spreading mechanism is removed. Fig. 12 is a detail view of one end of the cross-head, showing the anti-friction rollers; and Fig. 13 is a view of a dredger-hull with my improvements applied.

The suspended frame A may be hung from any suitable boom or similar apparatus. It preferably consists of tubular uprights $a$, having solid lower ends $a'$, to the lower ends of which are secured curved guide-rails B, which are braced to the uprights by diagonal stay-rods B'. The buckets or shells C D are arranged on opposite sides of the uprights and are secured to the guide-blocks E E', which are provided with anti-friction rollers $e\ e'$, that ride upon the curved guide-rails B. The blocks E and E' are pivoted to the side of the shell so as to move slightly relatively thereto when the blocks move along the guide-rails. A shaft F extends horizontally across and is journaled in the lower ends of the uprights, and on this shaft are rigidly secured a large pulley G and two smaller pulleys H. Near the ends of the shaft, on each side, is rigidly secured a pinion I, both of which are inside the uprights. These pinions mesh with curved rack-bars K K', the rack-bars K being pivotally secured to brackets $K^2$ on the upper inner corners of the buckets and extending over and meshing with the pinions. The rack-bars K' are similarly secured to the buckets and extend under the pinions and mesh therewith. The rack-bars K' rest on guide-blocks $k'$, and guides $k$ extend over the rack-bars K, as shown in Fig. 3. The rear ends of the buckets are connected by rods L to a cross-head M, mounted on the uprights and free to slide vertically thereon when not locked thereto by mechanism hereinafter described. The cross-head is preferably recessed at $m$ and provided with anti-friction rollers $m'$, as shown in Figs. 7, 8, and 12, so that it may move easily up and down without binding or undue friction. The rods L are pivoted to the rear ends of the buckets and to the cross-head, so that the buckets may be opened and closed without strain on the connections.

On the cross-head M are bolts for rigidly connecting it to the uprights when the cross-head is in its lowermost position, as shown in Figs. 1, 2, 3, and 7. As shown, the bolts consist of rods $n$ $n'$, connected by a cross-piece $n^2$, pivoted on the cross-head M. The rods $n$ $n'$ are connected with the cross-piece $n^2$ pivotally and in slotted bearings, as shown in Fig. 7. At their ends next the uprights the rods $n$ $n'$ extend through guide-blocks $n^3$. A spring $n^4$ tends normally to force the bolts toward the uprights, and when the cross-head M is in its lowermost position, as shown in the figures above mentioned, the bolts shoot into holes $n^5$ unless they are held withdrawn by a bolt-operating lever O, which is pivoted to the side of the cross-head. This lever O is formed with an upright piece $o$, which extends above the cross-head close to the end of the cross-piece $n^2$. The lower end of the upright-piece $o$ is pivoted at $o'$ to the cross-head M, and from this point a horizontal piece $o^2$ projects, and at its outer end is formed with a downwardly-projecting extension $o^3$, from which extends inwardly a foot-piece $o^4$. The foot-piece $o^4$ rests upon the upper side of a plate-spring P, which is secured at its ends $p$ $p$ to the under side of the cross-head M. Normally the spring P tends to assume the position shown in Fig. 7—i. e., withdrawn from the cross-head.

When the spring P is forced inward by devices hereinafter described, it rocks the bolt-shifting lever O on its pivot to withdraw the bolts $n$ $n'$ from the uprights A. The spring is also held from engaging with the lever O by a block Q, interposed between the spring and the cross-head. The block Q is connected with a spring-actuated rod Q', which extends through a guide-lug $q$, and is provided at its end next the upright with a beveled or detent end $q'$, which may engage with a recess $r$ in a bell-crank lever R, pivoted to the adjacent upright.

When in the position shown in Fig. 7 the block Q is held beneath the spring P, and the lever O does not tend to withdraw the bolts from the uprights; but when the bell-crank lever R is turned, so as to present the recess $r$ to the end $q'$ of the rod Q', the spring $q^2$ causes the withdrawal of the block Q from the spring P, and this spring when lifted or forced inward shifts the lever O and causes the bolts to be withdrawn. The bell-crank lever R is, however, normally held in the position shown in Fig. 7—that is, so as to hold the block Q between the spring P and the cross-head M—by means of a spring S, connected to the bell-crank lever R and to the adjacent upright at $s$. A rod T, connected to the lower end of the bell-crank lever R, extends downwardly through a guide T' on the guide-block $k$ $k'$. The extreme lower end of the rod T is enlarged and inclined at $t$, and at times engages with an inclined lug $t'$ on the upper face of one of the rack-bars K. When the lug $t'$ comes in contact with the end $t$ of the rod T, the rod T is lifted, so as to shift the bell-crank lever R and permit the withdrawal of the block Q from the spring P, thus effecting the unlocking of the bolts when the spring is operated by the lifting-block hereinafter described.

In case the buckets should fail to close entirely and the bell-crank lever R should not be operated automatically by the rod T and lug $t'$, it may be operated by a cord or chain $T^2$, attached to the lever R and extending over suitable pulleys to the hull of the dredger within convenient reach of the operator. The bucket-closing chain U is secured to the large pulley G, which is preferably grooved on its periphery, as shown in Fig. 3, and the bucket-opening chain V is preferably divided into two branches $v$ $v'$ of any desired length, as shown in Fig. 3, and secured to the grooved pulleys H H. A tripping-block U' is carried by the chain U, and the length of the chain below the block is preferably approximately equal to the distance between the cross-head M when at its uppermost position and the pulley G. A lifting-block V' is carried by the chain V, and the length of the chain V or its branches $v$ $v'$ below the block V' is about twice the length of the chain U below the block U'. The length of the chain U may be adjusted by a turn-buckle $U^2$ to take up wear or stretching. The block V' is provided with a latch $v^2$, slotted at $v^3$, through which slot extends a pin $v^4$. The inner face of the latch is inclined at $v^5$, as shown, and at its inner end is provided with a raised portion $v^6$ on its upper face. The lower rear end of the latch normally rests on a pin $v^7$. A spring $v^8$, secured to the block V', bears against the rear end of the latch and normally holds it in the position shown in Fig. 6. A spring $v^9$ coacts with the spring $v^8$ to hold the latch in the position shown. Above the latch $v^2$ is a bell-crank lever W, the lower end of which normally rests on the raised portion $v^6$ of the latch and holds it in the position shown in Fig. 6. In this position the cross-head M is above the latch, and if the latch is raised the cross-head M will be raised with it. A spring $w$ tends to hold the bell-crank lever W in the position shown by full lines in Fig. 6. The tripping-block U' is provided with a pivoted latch $u$, normally held in the position shown in Fig. 6 by a spring $u'$. The latch $u$ is pivoted to the block U' by a pin $u^3$, extending through a slot $u^4$, and the spring $u'$ is so formed and arranged as to both lift and force the latch inward. A tripping-finger $u^2$ is pivoted to the block U' above the latch-piece $u$ and projects across or nearly across the cross-head M. The inner end of the tripping-finger is provided with a downwardly-projecting arm $u^5$, which enters a recess in the upper end of the latch-piece $u$.

When the blocks V' and U' occupy the relative positions shown at the upper end of Fig. 6, the tripping-finger $u^2$ engages the inwardly-projecting end of the bell-crank lever W, so as to shift it, as shown by dotted lines, and the latch $v^2$ is relieved, so that if the upward movement of the block V' is continued the latch will move inwardly out of engagement with the cross-head M, the weight of the cross-head then coming on the latch $u$ of the block U'. The latch $u$ then drops and allows the lever W to pass the finger $v^2$. A bracket U³ is secured to the uprights A and carries a pulley U⁴, against which the chain bears and by which it is kept in position when the cross-head is transferred from the block V' to the block U'.

The details of construction of my improved apparatus having now been fully described, I will indicate how the apparatus is operated.

As shown in Fig. 13, the uprights A pass through the outer ends of a boom 1, secured to the mast 2 on a dredger-hull 3. The chains U, V, and T² pass over pulleys 4, and the chains U and V over a drum or drums 5. The cord or chain T², by which the tripping-lever R may be operated, extends over a pulley 6 above a platform 7, on which the operator may stand. Assuming that the apparatus is in the position shown in Fig. 1, ready to enter the earth and fill the buckets, it will be seen that the bucket-closing chain U is wound up on the pulley G more than one revolution, if desired, and the bucket-opening chains V and the extra or slack portion of the chains depend from the pulleys H. The cross-head M is in its lowermost position, and the bolts engage the uprights, so as to rigidly connect the cross-head thereto. If now the hoisting-chain U is drawn upward in the direction of the arrow 1, the pulley G will be rotated, thus rotating the shaft F and pinions I, which, engaging with the rack-bars K and K', draw the bucket-shells together in the direction indicated by the arrows 2. When the buckets have come together, as indicated in Fig. 2, the lug $t'$ engages with the end $t$ of the rod T, thereby shifting the bell-crank lever R and permitting the bolts to be withdrawn from the uprights when the latch $v^2$ presses upon the spring P. This movement also partially winds up the slack portion of the backing-chains V, as indicated in Fig. 2, and, as seen in Fig. 2, the tripping-block U' has reached its extreme upward position. The chain V is then drawn upwardly, and the latch $v^2$ presses against the spring P and causes it to operate the bolt-shifting mechanism. The cross-head M is then raised by means of the latch $v^2$ to the position shown in Fig. 4. During this upward movement the shaft F is not rotated, because in this movement the slack portion of the chain V (shown in Fig. 2) is taken up. When, however, the lifting-block has reached the position shown in Fig. 4, the chain V is drawn taut, and the bell-crank lever W comes in contact with the tripping-finger $u^2$ and is shifted, as shown in Fig. 4, and the latch is withdrawn, as indicated, thus allowing the lifting-block to pass through the guide-loop X. As the cross-head is thus moved upwardly the rods L are drawn with it and the buckets are opened and the contents dumped. Fig. 4 shows the buckets fully opened for dumping. After the latch is tripped, as shown in Fig. 4, the upward movement of the chain V is continued, and the chain now being taut unwinds from the pulleys H and winds up the hoisting-chain U on the pulley G. This movement operates the pinions I, which, engaging with the rack-bars K K', cause the buckets to spread apart to the position shown in Fig. 1. At the same time the cross-head M is lowered as the chain U is wound up on the pulley G, and when the cross-head has reached its lowermost position the bolts $n$ $n'$ engage with the holes $n^5$ in the uprights. The chain V is then lowered to the position shown in Fig. 1, the slack portion being below the cross-head, as there indicated. When in this position the apparatus is again operated, as above described.

It may be desirable sometimes to dispense with the apparatus for spreading the buckets—that is to say, when the apparatus is used to hoist soft material the spreading apparatus may not be necessary. The pivots of the buckets may then be made stationary, as shown in Figs. 10 and 11, the rack-bars being removed and replaced by curved bars X', and the blocks to which the buckets are pivoted are rigidly connected by means of the plate Y. When it is again desired to use the apparatus for hoisting hard material, the bars X' and plate Y are removed and the apparatus operated as before.

If desired, scrapers Z may be secured to the frame to bear upon the upper faces of the rack-bars to remove any material that would tend to adhere thereto, so that the rack-bars may pass freely through their guides. I preferably make the rack-bars hollow or with openings through them, so that they need not be clogged. Scrapers Z' may also be attached to the blocks E E' to remove obstructions from the guide-rails B.

I have shown in the drawings the cross-head M as adapted to move between certain limited points; but the movement of the cross-head may be varied to correspond with different sizes of buckets and to so adjust the connections as to relieve undue pressure or strain. When the bucket-spreading mechanism is omitted, a direct connection may be made between the shaft F and the cross-head M and operated in the usual way. The guide-rails B may be curved in any desired way; but preferably they are formed as shown in the drawings, so that the cutting-edges of the buckets may enter the material operated upon at an angle of about forty-five degrees, as shown in Fig. 1.

It will be observed that in closing the buckets the arc through which the inner pivotal supports of the buckets pass is of greater radius than the arc traversed by the pivotal connection between the outer ends of the buckets and the rods L, which are shorter than the radius of the arc which the inner pivots traverse. By this arrangement the buckets more effectively cut into and gather up the dredged material.

I have thus described an apparatus embodying my improvements which is both simple and efficient; but obviously the specific organization of instrumentalities and the details of construction may be varied without departing from the novel features of my invention.

What I claim as my invention is—

1. The combination, substantially as hereinbefore set forth, of the buckets, supports for the inner ends of the buckets which move toward and from each other in the arc of a circle, pivotal connections between these supports and the buckets, and the supporting-rods L for the outer ends of the buckets, which are shorter than the radius of the arc through which the inner ends of the buckets traverse.

2. The combination, substantially as hereinbefore set forth, of the uprights, the horizontally-curved guide-rails on their lower ends, the buckets, their pivots supported on the guide-rails, and mechanism substantially such as described for spreading apart and closing the buckets.

3. The combination, substantially as hereinbefore set forth, of the uprights, the guide-rails on their lower ends, the buckets, their pivots supported on the guide-rails, the rack-bars connected with the buckets, a rotatable shaft operatively connected with the rack-bars, and means for rotating the shaft.

4. The combination, substantially as hereinbefore set forth, of the uprights, the guide-rails on their lower ends, the buckets, the guide-blocks to which the buckets are pivoted and which are supported on the guide-rails, the rack-bars connected with the buckets, the shaft journaled in the lower ends of the uprights, pinions thereon engaging with the rack-bars, and mechanism for rotating the shaft.

5. The combination, substantially as hereinbefore set forth, of the uprights, the guide-rails on the lower ends of the uprights, the buckets, the guide-blocks to which they are pivoted, the rack-bars pivotally connected with the guide-blocks, the guides through which the rack-bars extend, the cross-shaft at the lower end of the uprights, pinions thereon engaging with the rack-bars, and mechanism substantially such as described for rotating the shaft.

6. The combination, substantially as hereinbefore set forth, of the uprights, the buckets, the pivots for the buckets at the lower ends of the uprights, mechanism substantially such as described for shifting laterally the pivots of the buckets, the vertically-moving cross-head, a chain or cable connected with the pivot-shifting mechanism to draw the buckets together, a chain or cable connected with the bucket-shifting mechanism to spread the buckets apart, and a lifting-block on said chain to raise the cross-head.

7. The combination, substantially as hereinbefore set forth, of the uprights, the buckets pivoted at the lower ends of the uprights, the shaft, connections between the pivots of the buckets and the shaft for spreading them and bringing them together, a bucket-closing chain connected with the shaft, a bucket-opening chain also connected with the shaft, a vertically-moving cross-head, rods connecting the cross-head with the rear ends of the buckets, and a lifting-block on the bucket-opening chain adapted to engage with the cross-head.

8. The combination, substantially as hereinbefore set forth, of the uprights, the buckets, the guide-rails, the guide-blocks thereon to which the buckets are pivotally connected, the cross-shaft at the lower ends of the uprights, pinions thereon, the rack-bars connected with the guide-blocks and engaging with the pinions, the vertically-moving cross-head, connections between the cross-head and the rear ends of the buckets, bolts rigidly connecting the cross-head with the uprights when the cross-head is in one position, and bolt-tripping mechanism automatically operated to unlock the bolts when the buckets are closed.

9. The combination, substantially as hereinbefore set forth, of the uprights, the guide-rails at the lower ends of the uprights, the guide-blocks thereon, the buckets pivotally connected with the guide-blocks, the rack-bars, a cross-shaft, pinions thereon engaging with the rack-bars, the vertically-moving cross-head, connections between the cross-head and the rear ends of the buckets, bolts for securing the cross-head to the uprights when the cross-head is at its lowermost position, bolt-shifting devices, substantially such as described, a lifting block and chain for raising the cross-head, a tripping-block for disconnecting the lifting-block from the cross-head, and a chain on which the tripping-block is carried.

10. The combination, substantially as hereinbefore set forth, of the uprights, the guide-rails at the lower ends of the uprights, the buckets, their pivots supported on the guide-rails, the cross-shaft, pinions thereon, the rack-bars engaging with the pinions and connected with the buckets, the vertically-moving cross-head, connections between the cross-head and the rear ends of the buckets, the lifting-block, a pulley on the shaft to which the lifting-block is connected, the backing-chain also connected with the shaft, a lifting-block secured to the backing-chain and having a latch engaging with the cross-head, a pivoted lever normally holding the latch in engagement with the cross-head, a tripping-block on the hoisting-chain, and a tripping-finger thereon adapted to engage with the lever and the lifting-block to shift it and permit the withdrawal of the latch from the cross-head.

11. The combination, substantially as hereinbefore set forth, of the uprights, the guide-rails thereon, the buckets, their pivots supported on the guide-rails, the rack-bars, mechanism for operating the rack-bars to close and spread the buckets, and the scrapers for cleaning the rack-bars and the guide-rails.

12. The combination, substantially as hereinbefore set forth, of the uprights, the buckets pivoted at the lower ends of the uprights, the vertically-moving cross-head, connections between the cross-head and the rear ends of the buckets, the bolts engaging with the uprights, a bolt-shifting lever, a spring with which it is connected, a block normally holding the spring out of engagement with the bolt-shifting lever, a spring-actuated rod to which this block is connected, a bell-crank lever operatively connected with this rod, and a tripping-rod connected with the bell-crank lever, for the purpose specified.

13. The combination, substantially as hereinbefore set forth, of the uprights, the pivoted buckets, the cross-head, the bolts for locking the cross-head to the uprights, a cord or chain for unlocking the bolts, and connections between the cross-head and the buckets for opening and closing them.

In testimony whereof I have hereunto subscribed my name.

ROBERT PINCKNEY HENRY.

Witnesses:
ROBT. W. HUNTER,
ALONZO G. DARCY.